United States Patent
Gjorup

(10) Patent No.: US 9,495,232 B2
(45) Date of Patent: Nov. 15, 2016

(54) ERROR CORRECTING (ECC) MEMORY COMPATIBILITY

(71) Applicant: Intel IP Corporation, Santa Clara, CA (US)

(72) Inventor: Karsten Gjorup, Aalborg (DK)

(73) Assignee: Intel IP Corporation, Santa Clara, CA (US)

( * ) Notice: Subject to any disclaimer, the term of this patent is extended or adjusted under 35 U.S.C. 154(b) by 31 days.

(21) Appl. No.: 14/228,333

(22) Filed: Mar. 28, 2014

(65) Prior Publication Data

US 2015/0278012 A1    Oct. 1, 2015

(51) Int. Cl.
*G06F 11/14*     (2006.01)
*G06F 11/10*     (2006.01)
*G06F 11/07*     (2006.01)

(52) U.S. Cl.
CPC ......... *G06F 11/076* (2013.01); *G06F 11/1048* (2013.01); *G06F 11/1068* (2013.01); *G06F 11/141* (2013.01)

(58) Field of Classification Search
CPC ............. G06F 11/1068; G06F 11/141; G06F 2211/109; G06F 11/076; G06F 11/1048
USPC ....................................................... 714/769
See application file for complete search history.

(56) References Cited

U.S. PATENT DOCUMENTS

| | | | | |
|---|---|---|---|---|
| 6,263,469 | B1* | 7/2001 | Jang | G11B 20/14 360/51 |
| 8,793,555 | B2* | 7/2014 | Hida | G06F 11/1068 365/185.09 |
| 2004/0123219 | A1* | 6/2004 | Cucchi | H04L 1/0065 714/760 |
| 2010/0235713 | A1* | 9/2010 | Lee | G06F 11/1072 714/763 |
| 2010/0332922 | A1* | 12/2010 | Chang | G11C 5/143 714/704 |
| 2010/0332923 | A1* | 12/2010 | D'Abreu | G06F 11/1068 714/708 |
| 2010/0332943 | A1* | 12/2010 | D'Abreu | G06F 11/1068 714/763 |
| 2010/0332951 | A1* | 12/2010 | Peng | G11C 5/143 714/773 |
| 2012/0110417 | A1* | 5/2012 | D'Abreu | G06F 11/1012 714/773 |
| 2014/0040664 | A1* | 2/2014 | Hida | G06F 11/1068 714/15 |
| 2014/0059406 | A1* | 2/2014 | Hyun | G11C 11/5621 714/773 |

* cited by examiner

*Primary Examiner* — James C Kerveros
(74) *Attorney, Agent, or Firm* — Chapin IP Law, LLC

(57) ABSTRACT

Host device platforms developed based on older ECC (Error Correcting Code) designs may not be equipped to handle the enhanced error correction capabilities in the newer NAND memories. Error correcting memory employing an error threshold representative of the additional capability of the ECC memory allows determining when a fetch has exceeded a safe level of errors to correct. ECC processing compares an error count to the threshold, and if the error count exceeds the threshold of maximum allowable errors, the ECC status module induces an error in the fetched data to alert the host.

23 Claims, 5 Drawing Sheets

ERROR CORRECTING (ECC) MEMORY COMPATIBILITY

BACKGROUND

Small, portable computing devices such as cellphone, smartphones, laptops, tablets and music/video player devices have become popular in recent years. As with most conventional computing devices, portable computing devices have a need for non-volatile storage for storing programs and data while powered down. Solid state memory lends itself well to such devices due to greater resistance to physical agitation, as from being dropped or carried. Accordingly, solid state memory is increasingly in demand for providing reliable, non-volatile storage for portable devices.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
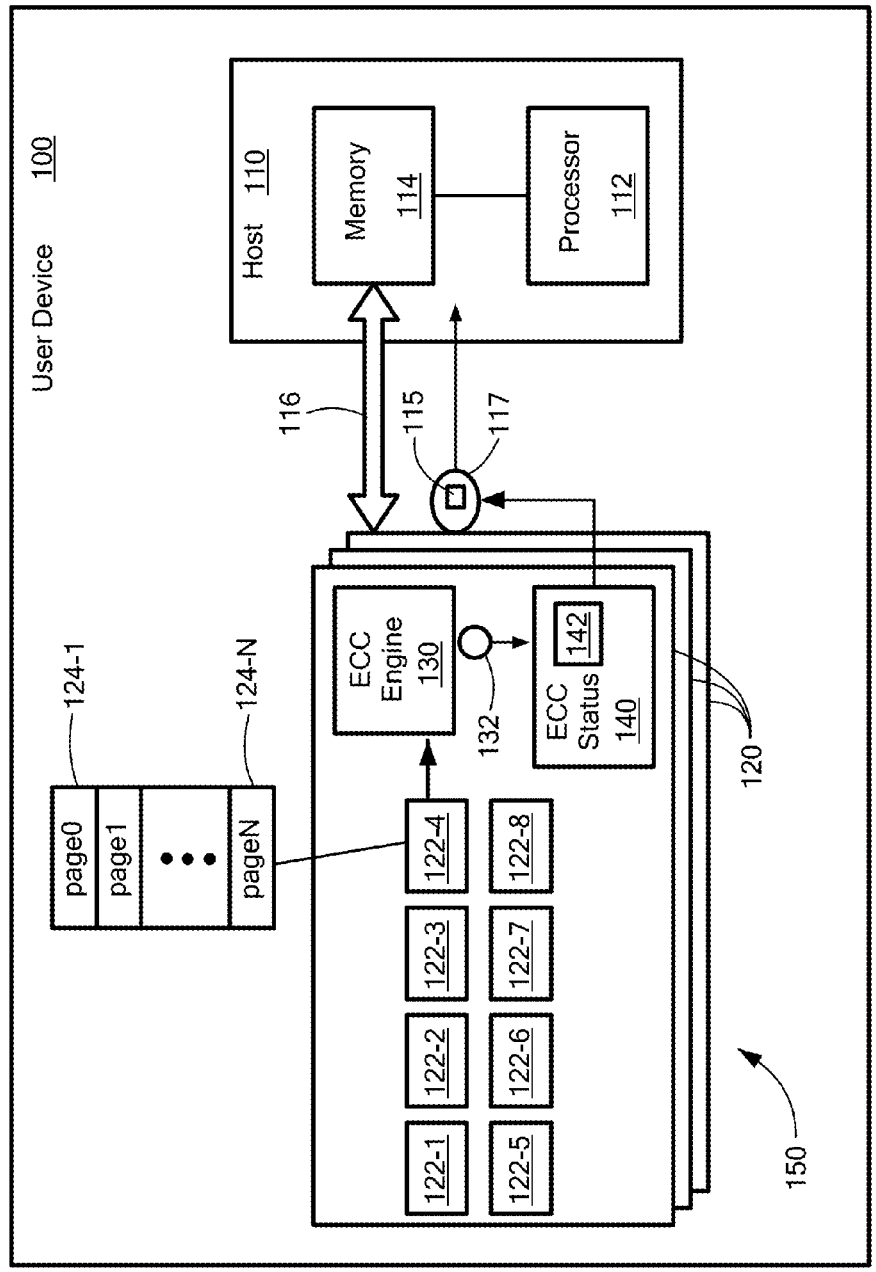
FIG. 1 is a context diagram of a computing device suitable for use with configurations herein.

Solid state storage devices employ solid state memory in the form of a solid state drive (SSD). Many SSDs use memory having memory capable of employing error correcting codes (ECC) for correcting individual bit errors in a fetched page, cell, or segment. Such error correcting memory, or ECC memory, has become increasingly advanced such that multiple bit errors are correctible in a single segment, to ensure acceptable data reliability.

Mobile phones and other standalone devices have employed NAND flash memory as boot device for persistence between user "powered on" sessions, relieving the need for motion sensitive rotational media. A typical NAND flash consists of a plurality of blocks, each with a plurality of pages. Each page is divided into main area and spare area. Examples could be that main area is 2048 bytes and spare area is 64 bytes. The extra area (spare area) is meant for book keeping for the SW and to have ECC check bytes. The ECC check bytes are needed as a NAND flash can be prone to both permanent as well as temporary bit errors. Various ECC schemes have been implemented to identify and correct bit errors, to increase data reliability to an acceptable level.

Early in the evolution of ECC memory, a requirement from chip providers was that the ECC system should be able to correct 1 bit per 528 bytes. That was typically done in dedicated HW on the host processor to ensure acceptable read and write speed. However, modern requirements to ECC have become higher as the production technology has become smaller. Typical ECC requirements today dictate 4-bit ECC per 528 bytes or 8-bit ECC per 528 bytes. However, certain popular, older platforms only employ 1 bit HW ECC build in for NAND flash support, but are burdened by requirements for NAND flash that is 4-bit or 8-bit ECC.

To ensure that old host processors are bootable on new generation NAND flashes, flash vendors have created Error Free NAND flashes like ECC flash, which contains both memory cells and a HW ECC engine. The onboard ECC engine operates such that the possible bit errors are corrected before the host processor reads out the data. In this manner, a 1 bit correction host processor can use a NAND flash with 8-bit ECC requirement on the memory cells. As the possible errors are already corrected before the data is read from the flash memory, the host processor would not be able to detect possible bit errors with its own 1-bit ECC HW. To obtain the actual ECC status information from the flash memory, the host processor sends an additional command to request that information. However, the extra status request adds time to the overall communication with the flash, and also prevents the driver from parallelizing data read out in a speed optimal way by requiring an extra status exchange for each page or segment read Configurations herein are based, in part, on the observation that newer NAND/flash memory developments have more robust error correction capabilities and are able to correct more errors per unit of memory fetched. Unfortunately, conventional approaches suffer from the shortcoming that current host device platforms that were developed based on older ECC designs may not be equipped to handle the enhanced error correction capabilities in the newer NAND memories.

While memory advances continue to improve ECC performance and correct additional errors per memory segment fetched, device vendors may opt to continue to produce device platforms that includes less robust error correction. Configurations disclosed below substantially overcome the above-described shortcomings by employing an error threshold representative of the additional capability of the ECC memory to determine when a fetch has exceeded a safe level of ECC errors, which is acceptable before data should be moved. Otherwise, older host platforms need to perform an explicit status request to determine the number of bit error corrected within the last read. Such an approach ensures that the ECC status information is transferred to the host processor in a backwards compatible way, and without adding to the communication time or preventing the driver from parallelizing the data read sequence. In this manner, the disclosed approach allows host platforms to remain backwards compatible with more advanced ECC memory without hindering performance from additional ECC status checks.

FIG. 1 is a context diagram of a computing device suitable for use with configurations herein. Referring to FIG. 1, a user computing device 100 such as a smartphone, tablet, laptop, audio/video player or similar device includes a host 110 and a memory 120 such as a plurality of NAND or flash memory modules in an SSD (solid state drive) 150. The host 110 includes a processor 112 and a host memory 114 for storing and executing applications and data received from the memory 120. The memory 120 includes a plurality of memory banks 122-1 . . . 122-8 (122, generally). Any suitable number of memory banks 122 may be included in a particular configuration, depending on the architecture and storage capacity called for. Each of the memory 122 banks has a plurality of pages 124-1 . . . 124-N, representing the quantity of memory typically fetched. A fetch may correspond to any suitable portion of stored data on the memory 120, such as a block or sector, and will be referred to as a page 124 herein. The memory 120 is typically solid state non-volatile storage having error correcting features, as discussed further below. More recently, error correcting capability has been added to flash memories, to offset this burden from an attached host. Such ECC flash memory, referred to as EF NAND (error free NAND) herein, attempt to correct bit errors before the data reaches a corresponding host. Configurations discussed below encompass the scenario where newer flash memory has differing or more advanced error correction capability (ECC) than the host it serves.

The memory 120 therefore maintains applications and data when the device 110 is powered down, and include on-board ECC engine 130 and ECC status module 140, however other implementations, such as standalone EF NAND configurations, commonly referred to a "flash drives" or "jump drives", may also be employed. The ECC engine 130 and status module 140 may be included in any suitable configuration, such as included in the memory banks 122.

During data reads/fetches from an EF (Error Free) NAND, such as a storage component 120, the host processor 112 determines if data would have to be moved out of the block to refresh the data or if it is safe to leave it in the block as fetched. On NAND flashes developed under a 1 bit ECC requirement, the data refresh is triggered when a 1 bit error is detected in the memory cells. By allowing the NAND to be configurable to generate a 1-bit ECC error at a certain threshold (number of bit errors in a page), the host processor 112 is capable of detecting bit errors without dedicated status reads from the memory 120. Thereby, older generations of host processors can do data relocations, etc., without jeopardizing data read speed, as the host processor 112 is able to detect the 1-bit ECC error with its internal flash controller. Accordingly, configurations herein employ an ECC status module 140 in the EF NAND functionality to compare the detected number of bit errors 132 in a page with the threshold error value 142. If the number of bit errors found is above the threshold, then a 1 bit error is created in the data 117 given to the host processor 112. Such a 1 bit error will trigger the host processor 112 to correct the error. Such a correction is performed by a Flash Translation Layer (FTL), which (in the disclosed configuration) is running on the host processor 112. Therefore, if the number of bit errors 132 is above the threshold error value 142, then the processor 112 will read out the entire block or page and write the corrected data to a different location of the disk. Finally it will erase the original block. As the bit error information is now part of the standard exchange of data between the host processor 112 and the memory 120, a separate ECC status exchange need not accompany every retrieval, in contrast to conventional approaches discussed below with respect to FIG. 2.

An ECC engine 130 performs error correction on the pages 124 (or other sized portion, such as a block or sector) fetched from the memory 120, and a bus 116 transfers the fetched data to the host memory 114 (typically volatile storage) for access by the processor 112 in the launching and execution of applications (programs). An ECC status module 140 includes a threshold error value 142 that indicates the maximum number of bit errors that is allowed in each page. The ECC engine 130 computes and sends an error count 132 indicating the number of errors in a given page 124 fetch. The ECC status module 140 compares the error count 132 to the threshold error value 142, and if the error count 132 exceeds the threshold 142 of maximum allowable errors, the ECC status module generates a 1-bit error 115 in the data 117 transferred to host 110, to which the processor 112 will read out the entire page and write the corrected data to a different location of the memory 120. Finally it will erase the original block.

Before the advent of EF NAND memory, fetched data was returned to the host processor for ECC checking and correction. If an error correction computation indicated an unreliable transfer, the data has already been read out and/or parity and similar mechanisms used to correct the erroneous bits. Conventional EF NAND memory, as depicted in FIG. 2, corrected the fetched data prior to the host processor, however still triggered an additional status request, slowing performance, now discussed with respect to FIG. 2.

Figure 2:
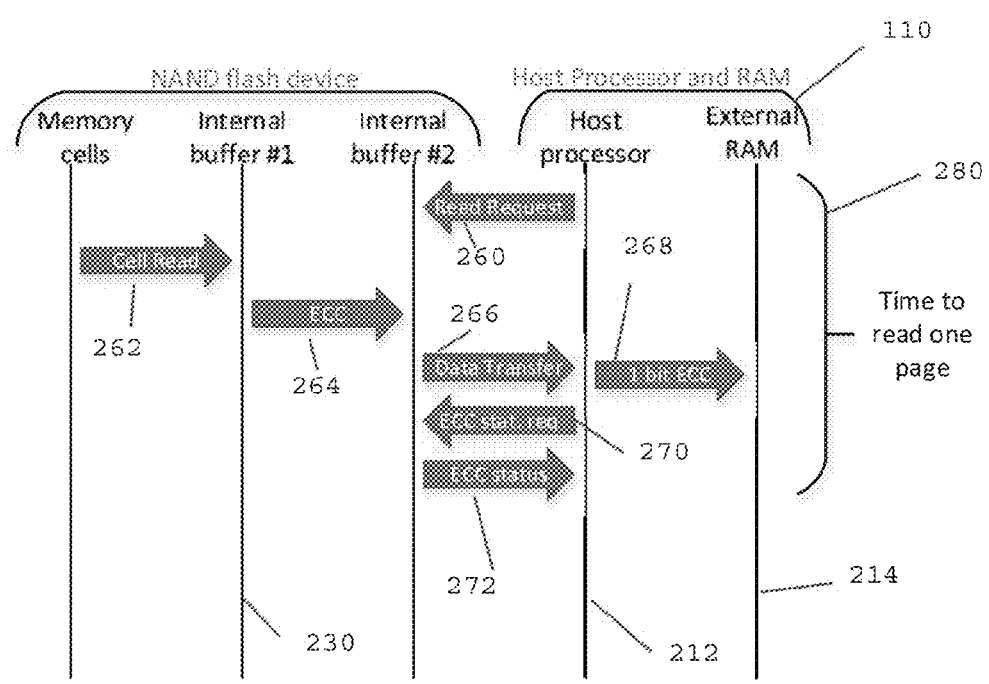
FIG. 2 is a flow diagram of conventional ECC processing.

FIG. 2 is a flow diagram of conventional ECC processing in a host system with conventional EF NAND memory. Referring to FIGS. 1 and 2, in a conventional memory fetch using EF NAND, the host processor 212 issues a read request 260. The corresponding memory bank 122 responds with a cell read 262, such as a page 124. ECC processing 264 operates on a first internal buffer 230, and a data transfer 266 transmits the data across the bus 116 to the host processor 112. Subsequently, the host processor 212 issues an ECC status request 270 to obtain an ECC status 272, and the data is transferred to memory (external RAM 214) as corrected or refetched, if the errors exceeded the error correcting capability, based on the ECC status request 270. Accordingly, conventional ECC approaches need to explicitly request the ECC status 272.

Configurations herein communicate the information "below or above ECC threshold" through a generated 1-bit error in the communicated data. In this manner a NAND memory 122 becomes backwardly compatible, as the host processor 112 system will automatically trigger the data refresh by data move out whenever needed. By eliminating the explicit status request 270, the overall flow of the data from the memory cells 122 and to the external RAM (host memory 114) of the host processor 112 will be optimized, so that overall performance is improved.

Figure 3:
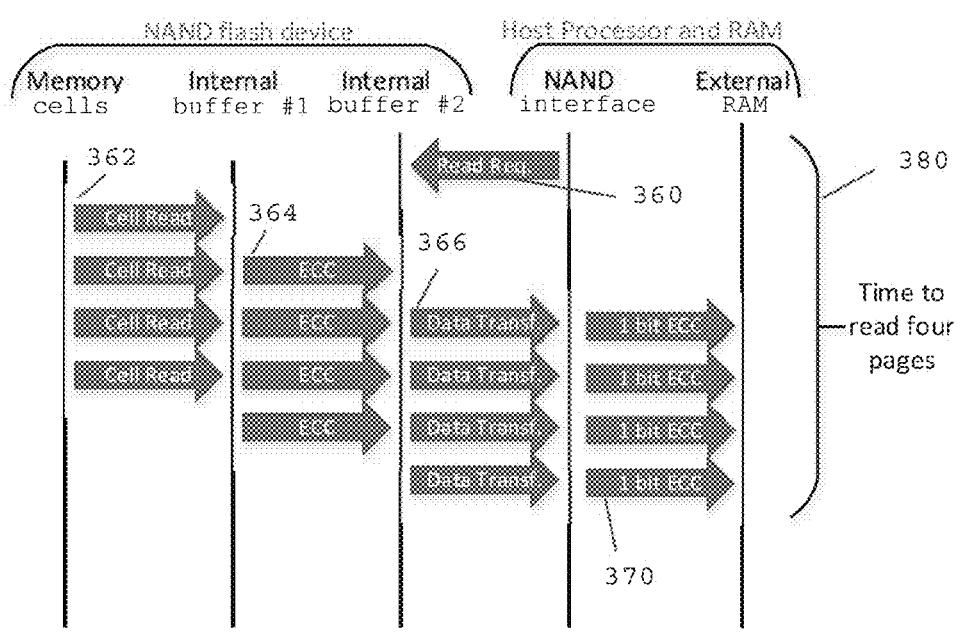
FIG. 3 is a flow diagram of ECC processing as disclosed herein.

FIG. 3 is a flow diagram of ECC processing as disclosed herein. Referring to FIGS. 1, 2 and 3, employing the ECC status computation and threshold error value comparison as disclosed herein, the host 110 issues a read request 360 for four pages. In contrast to FIG. 2, where the host processors 212 expect only a 1 bit ECC code/result 268, and do not anticipate more modern ECC arrangements that handle (correct) additional bit errors, the memory 120 includes ECC hardware such as the ECC engine 130 that corrects the errors and alleviates the need for a refetch. A cell read 362 triggers an ECC computation 364, which also computes the error count 132. The data transfer 366 occurs, and if the comparison of the error count 132 with the threshold error value 142 indicates that the error count 132 exceeds the threshold, then the ECC status logic 140 modifies the corrected data so that the data transferred 366 includes a 1 bit error. If the comparison indicates that the error count 132 is less than or equal to the threshold error value, then the ECC status module 140 does not modify the data prior to the data transfer 366. On the host processor 112 the existing 1 bit ECC algorithm detects, during transfer of the data to external RAM 370, if the ECC status logic 140 have modified the data or not by writing an error 115 to the transferred data 117. As can be seen from the "cascading" flow in FIG. 3, the memory cell read out can be done in parallel with the ECC calculation and the data transfer to host processor 112. Since the host 110 does not need to issue and evaluate an explicit status request 270 and result 272, four pages can be fetched in the time 380 that a conventional exchange 280 can retrieve one.

Figure 4A:
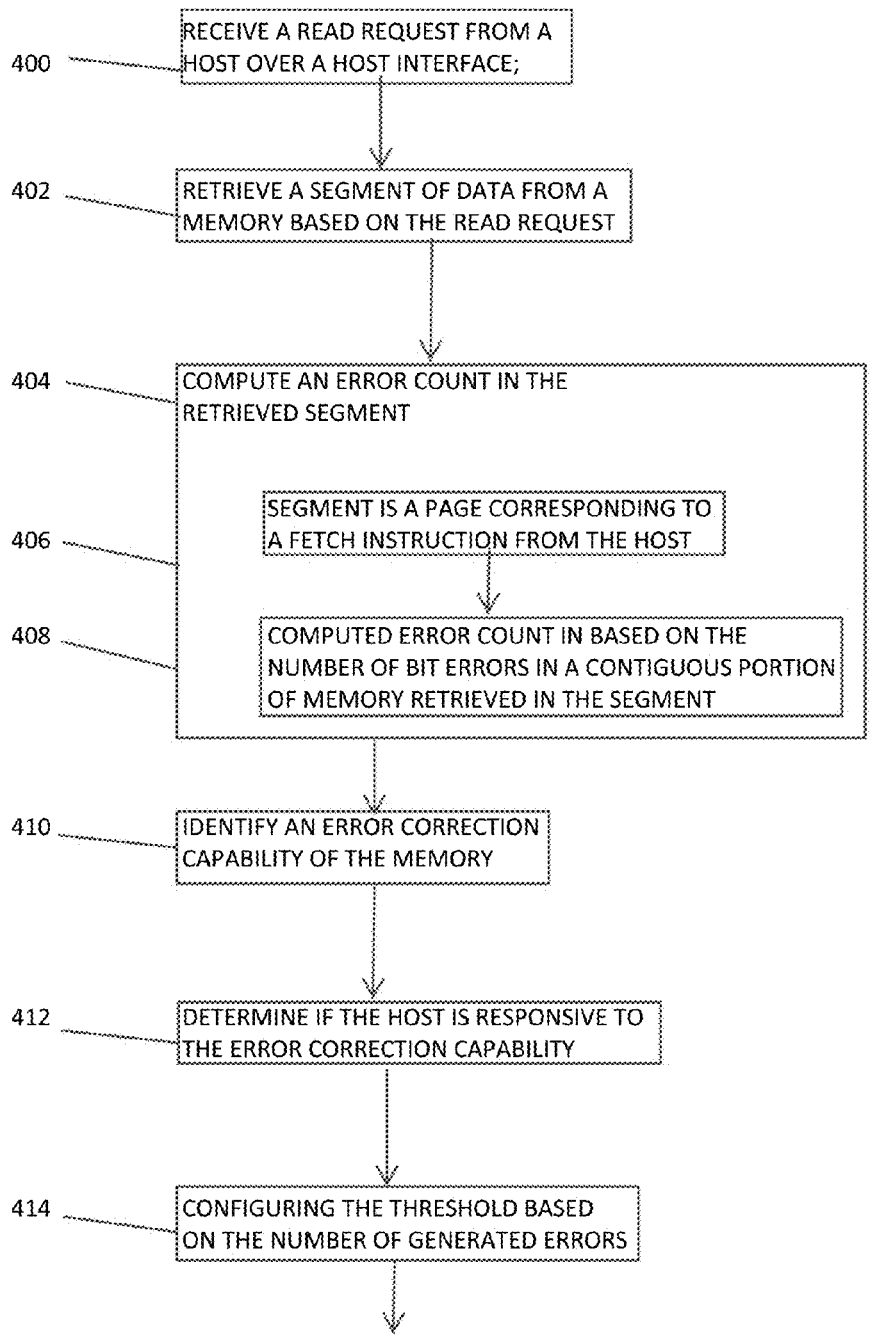
FIGS. 4a-4b are a flowchart of ECC processing.
Figure 4B:
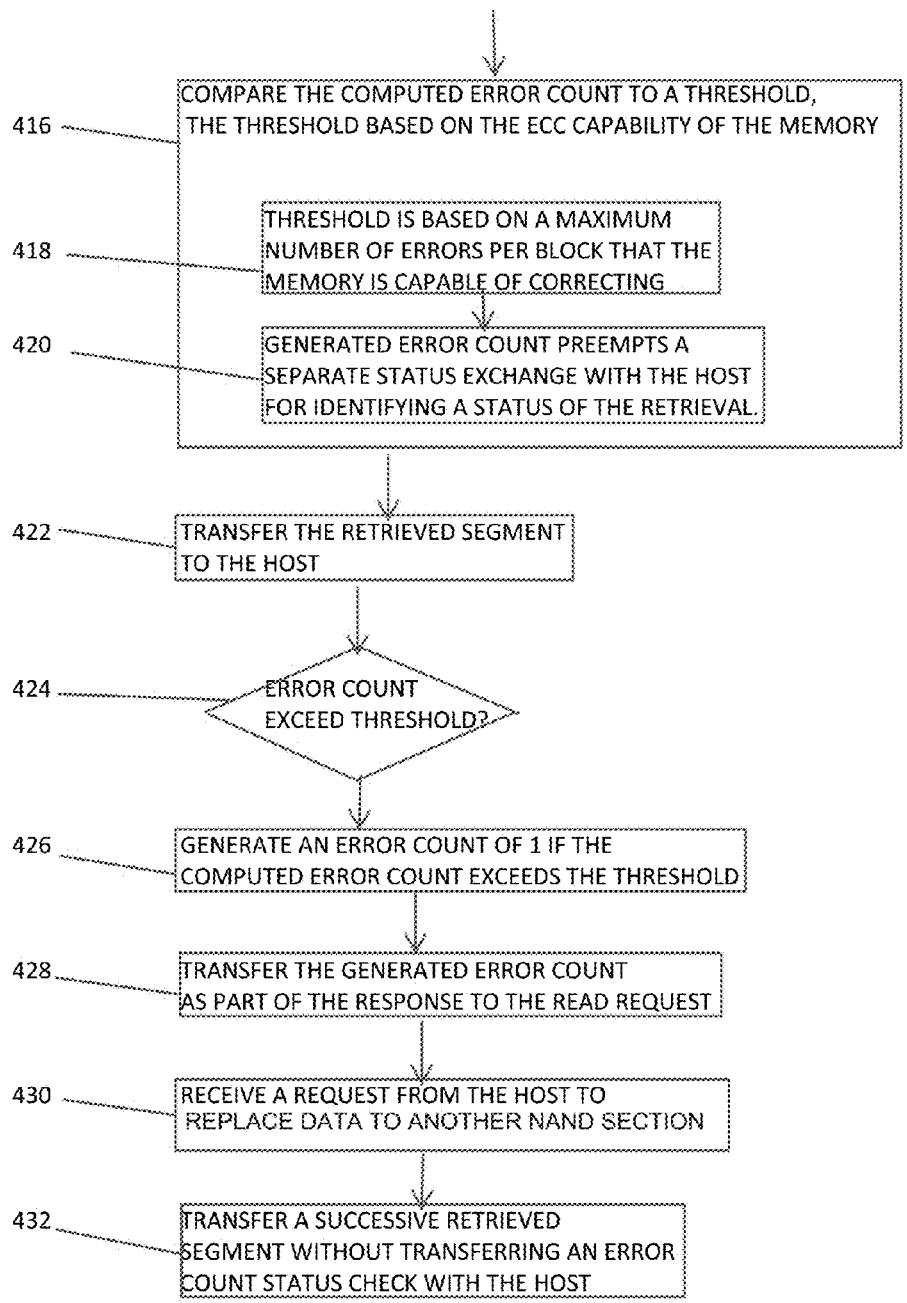

FIG. 4 is a flowchart of ECC processing. Referring to FIGS. 1, 3 and 4, the method of memory access as disclosed herein includes, at step 400, receiving a read request 360 from a host 110 over a host interface such as a bus 116 or other control line. In response, the memory 120 retrieves a segment of data such as a page 124 from the memory 122 based on the read request 360, as depicted at step 402. In the example configuration, the memory has an ECC engine 140 which is able to correct a particular number of bit errors from the NAND flash in the memory 122 prior to transmission over the host interface (bus 116). Modern ECC memories are typically rated by a number of errors correctable per page.

The ECC engine 130 computes an error count 132 in the retrieved segment, as depicted at step 404. Depending on the ECC capabilities of the memory, the number of errors correctable by the memory may vary. In an example arrangement, the segment may be a page 124 corresponding to a fetch instruction from the host 110, as disclosed at step 406. The size of the memory segment fetched may vary and need not be a page but may be any suitable size. The corrected error count 132 in based on the number of bit errors in a contiguous portion of memory retrieved in the segment, as shown at step 408.

The ECC status module 140 identifies an error correction capability of the memory 120, as shown at step 410. Alternatively, this capability may be predetermined as a configuration parameter or other suitable means and maintained for subsequent comparison (below). Since newer memories may have error correction capabilities of a greater number of errors than the host 110 expects, the ECC status module 140 determines if the host 110 is responsive to the error correction capability, as depicted at step 412. The ECC status module 140 sets the threshold error value 142 based on the identified error correction capability if the host 110 does not correspond to the error correction capability of the memory 120 (i.e. expect a different maximum bit error count). If the memory has a higher ECC capability than the host (i.e. 8 bit ECC on a 1 bit platform), the host will employ the threshold error value 142 as defined herein, to avoid specific status checks. The ECC status module 140 receives a setting from the host 110 for the threshold error value 142, which will vary in response to the error results received from the memory and the frequency with which the threshold is triggered. Initially, the ECC status module 140 may set the threshold high—then later on the host 110 can reconfigure the threshold error value. In other words, if the host 110 does not recognize multiple error counts, the threshold may be set based initially on the maximum number of errors that the memory 120 can correct with the ECC engine 130. The ECC will iteratively configure the threshold 142 based on the number of generated errors observed, as shown at step 414.

The ECC status module 140 compares the corrected error count 132 to the threshold 142, in which the threshold is based on the ECC capability of the memory 120, as depicted at step 416. As indicated above, the threshold 142 is based on of a maximum number of errors per block that the memory is capable of correcting, as disclosed at step 418. After the threshold has been reconfigured by the host 110—the threshold 142 should be below the memory ECC capabilities. The generated error count (discussed below) also preempts a separate status exchange 270 with the host 110 for identifying a status of the retrieval (step 420), common in conventional approaches shown above in FIG. 2, therefore improving performance by allowing the retrievals to occur without explicit status requests after each segment, as shown in FIG. 3.

The ECC engine 130 transfers the retrieved segment to the host memory 114 at step 422, and a check is performed, at step 424, to determine if the error count 132 exceeds the threshold 142, and If not, then the ECC status module 140 generates an error count of a predetermined value (such as 1) since the corrected error count 132 exceeds the threshold 142, as depicted at step 426. The ECC status module 140 transfers the generated error count as part of the response to the read request 360, as shown at step 428. Since the host 110 has already received the corrected data from the ECC engine 130, the ECC status module 140 generates an 1 bit error 15 in the transmitted data is to trigger the host 110 to replace the data to another NAND section, as depicted at step 430.

Since a separate status request 270 is not needed, the memory 120 may transfer a successive retrieved segment without transferring an error count status check with the host 110 and slowing performance, as depicted at step 432

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of memory access, comprising:
comparing a memory error count for a retrieved block of non-volatile memory to a threshold error value, the threshold error value based on an Error Correcting Code (ECC) capability of the non-volatile memory; and
assigning an error value to the retrieved block based on the comparison of the threshold error value and transferring the assigned error value if the memory error count exceeds the threshold error value, the threshold error value indicative of a maximum number of correctable errors per block of the non-volatile memory, the assigned error value based on a host processor issuing a request for the retrieval.

2. The method of claim 1 further comprising generating an error count of a particular value for the assigned error value if the memory error count exceeds the threshold error value.

3. The method of claim 2 further comprising:
transferring the assigned error value as part of the response to the read request.

4. The method of claim 2 wherein the threshold error value is indicative of a maximum number of errors per block that can be accommodated before assigning the error value, the error value specified by the host processor.

5. The method of claim 2 wherein the assigned error value preempts a separate status exchange with the host processor for identifying a status of the retrieval.

6. The method of claim 2 further comprising:
identifying an error correction capability of the memory;
determining if the host processor is responsive to the error correction capability; and
receiving, from the host processor, an indication to set the threshold error value based on the identified error correction capability if host processor does not correspond to the error correction capability of the memory, the host processor being responsive to the assigned error value.

7. The method of claim 1 further comprising transferring a successive retrieved block without transferring an error count status check with the host processor.

8. The method of claim 1 further comprising configuring the threshold error value based on the number of errors correctable by the non-volatile memory.

9. The method of claim 1 wherein the memory error count is based on the number of bit errors in a contiguous portion of memory retrieved in the block.

10. The method of claim 1 wherein the block is a page corresponding to a fetch instruction from the host processor.

11. The method of claim 1 wherein the error value recognized by the host processor defines a value different then the threshold error value.

12. The method of claim 1 wherein returning the assigned error value avoids a separate status inquiry by the host processor.

13. The method of claim 1 wherein the threshold error value is the ECC rating of the memory and the assigned error value defines a 1 bit error.

14. The method of claim 1 further comprising transferring the retrieved block with the assigned error value.

15. A memory device comprising:
a memory operative to store and retrieve blocks;
a correction engine for identifying and correcting errors in the retrieved blocks;
a host interface responsive to a host processor for reading the stored blocks;
a memory_error count, the memory error count assigned by the correction engine;
a threshold error value, the threshold error value based on an Error Correcting Code (ECC) capability of the memory, the memory responsive to the host processor; and
an ECC status module for comparing the memory error count to the threshold error value,
the host interface configured to assign an error value to the retrieved block based on the comparison of the threshold error value and adapted to transfer the assigned error value if the memory error count exceeds the threshold error value, the threshold error value indicative of a maximum number of correctable errors per block of the memory, the assigned error value based on a host processor issuing a request for the retrieval.

16. The memory device of claim 15 wherein the ECC status module is configured to modify the retrieved block to incorporate a 1-bit error.

17. The memory device of claim 16 wherein the host interface is configured to:
transfer the assigned error value as part of the response to the read request.

18. The memory device of claim 16 wherein the threshold error value is preconfigured to be the maximum number of errors per block that the memory is capable of correcting.

19. The memory device of claim 16 wherein the assigned error value preempts a separate status exchange with the host processor for identifying a status of the retrieval.

20. The memory device of claim 17, wherein the threshold error value comparison and data manipulation is done prior to transfer is done on each ECC block.

21. The memory device of claim 15 wherein the host interface is configured for transferring a successive retrieved block without transferring an error count status check with the host processor.

22. A computing device comprising:
a memory operative to store and retrieve blocks;
a correction engine for identifying and correcting errors in the retrieved blocks;
a host interface responsive to a host processor for exchanging the stored blocks;
a memory error count, the memory error count corrected by the correction engine;
a threshold error value, the threshold error value based on the ECC capability of the memory for identifying a number of errors correctable by the correction engine and for comparing the memory error count to the threshold error value;
an ECC status module configured to assign an error value in the retrieved block based on the comparison of the threshold error value and adapted to transfer the assigned error value if the memory error count exceeds the threshold error value, the threshold error value indicative of a maximum number of correctable errors per block of the memory, the assigned error value based on a host processor issuing a request for the retrieval and
a display for rendering data in the retrieved blocks.

23. A computer program product having instructions encoded on a non-transitory computer readable storage medium that, when executed by a processor, perform a method of memory access, comprising:
comparing a memory error count for a retrieved block of non-volatile memory to a threshold error value, the threshold error value set by a host processor in response to an Error Correcting Code (ECC) capability of the non-volatile memory,
transferring the retrieved block to the host processor error free if the memory error count does not exceed the threshold error value; and
assigning an error value in the retrieved block based on the comparison of the threshold error value and transferring the assigned error value if the memory error count exceeds the threshold error value, the threshold error value indicative of a maximum number of correctable errors per block of the non-volatile memory, the assigned error value based on a host processor issuing a request for the retrieval.

* * * * *